United States Patent
Barritz

(10) Patent No.: US 7,197,431 B2
(45) Date of Patent: *Mar. 27, 2007

(54) METHOD AND SYSTEM FOR DETERMINING THE USE AND NON-USE OF SOFTWARE PROGRAMS

(75) Inventor: Robert Barritz, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 914 days.

This patent is subject to a terminal disclaimer.

(21) Appl. No.: 09/933,540

(22) Filed: Aug. 20, 2001

(65) Prior Publication Data

US 2002/0026631 A1 Feb. 28, 2002

Related U.S. Application Data

(60) Provisional application No. 60/226,816, filed on Aug. 22, 2000.

(51) Int. Cl.
*G06F 11/30* (2006.01)

(52) U.S. Cl. .......................... 702/186; 714/38; 714/39; 714/47

(58) Field of Classification Search ................ 715/740; 700/1; 714/38, 39, 47; 717/102, 127, 131, 717/107, 130; 702/186
See application file for complete search history.

(56) References Cited

U.S. PATENT DOCUMENTS

| | | | | |
|---|---|---|---|---|
| 3,906,454 A | * | 9/1975 | Martin | 714/45 |
| 4,821,178 A | * | 4/1989 | Levin et al. | 714/47 |
| 4,858,152 A | * | 8/1989 | Estes | 702/186 |
| 5,386,369 A | * | 1/1995 | Christiano | 705/400 |
| 5,499,340 A | * | 3/1996 | Barritz | 714/47 |
| 5,528,753 A | * | 6/1996 | Fortin | 714/35 |
| 5,590,056 A | * | 12/1996 | Barritz | 702/186 |
| 5,949,415 A | * | 9/1999 | Lin et al. | 715/740 |
| 6,430,708 B1 | * | 8/2002 | Evans | 714/38 |
| 6,788,980 B1 | * | 9/2004 | Johnson | 700/1 |
| 6,996,807 B1 | * | 2/2006 | Vardi et al. | 717/127 |

* cited by examiner

*Primary Examiner*—Van Hoa Nguyen
(74) *Attorney, Agent, or Firm*—Ostrolenk, Faber, Gerb & Soffen, LLP

(57) ABSTRACT

A method and system for auditing software systems by monitoring the use and non-use of software programs in a computer. An operating system of the computer controls execution of software products through the invocation of respective load modules thereof. A monitor is periodically triggered to collect load module execution information, which is filtered by a filtering module, and a correlator correlates load module execution information with data that associates load module names with corresponding software products and develops a list of products executed in the computer over the course of a given time period.

28 Claims, 7 Drawing Sheets

| <user> | <pid> | <parent> | <started> | <CPU> | <command> | 36 |
|---|---|---|---|---|---|---|
| .... | | | | | | |
| lurch | 3376 | 1 | 10:08:47 | 0:01 | /usr/bin/vkbd -nopopup | |
| lurch | 3399 | 3388 | 10:10:56 | 0:01 | /usr/etc/telnet foobar.com | |
| lurch | 3401 | 3376 | 10:17:19 | 0:45 | /usr/local/netscape | |
| Gomez | 3549 | 1 | 11:23:01 | 0:00 | /bin/tsch (tcsh) | |
| Thing | 3586 | 1 | 11:23:45 | 0:00 | /bin/tsch (tcsh) | |
| Gomez | 3588 | 3549 | 11:24:31 | 0:00 | /usr/bin/man nice | |
| Gomez | 3594 | 3588 | 11:24:31 | 0:00 | /bin/sh -c less /tmp/man15 | |
| Gomez | 3595 | 3594 | 11:24:32 | 0:01 | /usr/bin/less /tmp/man15 | |
| Thing | 3599 | 3586 | 11:25:10 | 0:09 | /usr/bin/emacs unixgrep.txt | |
| lurch | 3653 | 3376 | 14:57:55 | 0:14 | /usr/bin/grep Lurch junk.txt | |
| .... | | | | | | |
| root | 3691 | 12 | 15:00:00 | 0:00 | /etc/monitor | |
| root | 3692 | 3691 | 15:00:00 | 0:00 | /bin/ps -ef | |

Figure 2 — 38

| <user> | <pid> | <parent> | <started> | <CPU> | <command> | 40 |
|---|---|---|---|---|---|---|
| .... | | | | | | |
| lurch | 3376 | 1 | 10:08:47 | 0:01 | /usr/bin/vkbd -nopopup | |
| lurch | 3399 | 3388 | 10:10:56 | 0:02 | /usr/etc/telnet foobar.com | |
| lurch | 3401 | 3376 | 10:17:19 | 0:56 | /usr/local/netscape | |
| Gomez | 3549 | 1 | 11:23:01 | 0:00 | /bin/tsch (tcsh) | |
| Thing | 3586 | 1 | 11:23:45 | 0:00 | /bin/tsch (tcsh) | |
| Gomez | 3705 | 3549 | 15:02:46 | 0:01 | /usr/login/Gomez/locate it | |
| Thing | 3599 | 3586 | 11:25:10 | 0:13 | /usr/bin/emacs unixgrep.txt | |
| Fester | 3709 | 1 | 15:04:31 | 0:00 | /bin/tsch | |
| .... | | | | | | |
| root | 3712 | 12 | 15:05:00 | 0:00 | /etc/monitor | |
| root | 3713 | 3712 | 15:05:00 | 0:00 | /bin/ps -ef | |

42 — Figure 2A

```
<user>  <pid>  <command>  <file>                              48
....
lurch   3376   vkbd       /usr/tmp/tempfile3376_20000401
lurch   3399   telnet     /usr/etc/foobar.com
lurch   3401   netscape   /usr/local/netscape/netscape.ini
lurch   3401   netscape   /usr/local/netscape/netscape.dat
lurch   3401   netscape   /usr/tmp/tempfile3401_20000401
Gomez   3588   man        /etc/man.conf
Gomez   3595   less       /tmp/man15
Thing   3599   emacs      /usr/login/Thing/unixgrep.txt
Thing   3599   emacs      /usr/local/info
Thing   3599   emacs      /usr/local/com/emacs/lock
Thing   3599   emacs      /usr/tmp/tempfile3599_20000401
....
```

Figure 3

```
//REPORTER JOB ....                                150
//JOBLIB    DD   DSNAME=PRODUCTA.LOADLIB ....
//STEP1     EXEC PGM=FIND
// ....
//STEP2     EXEC PGM= SORTB, ....
//STEPLIB   DD   DSNAME=PRODUCTB.LOADLIB ....
// ....
//STEP3     EXEC PGM= RPORTA, ....
// ....
```

Figure 6

METHOD AND SYSTEM FOR DETERMINING THE USE AND NON-USE OF SOFTWARE PROGRAMS

RELATED APPLICATION

This Application claims priority and is entitled to the filing date of U.S. Provisional Application Ser. No. 60/226,816 filed Aug. 22, 2000, and entitled "METHOD AND SYSTEM FOR DETERMINING THE USE AND NON-USE OF SOFTWARE PROGRAMS," the contents of which are incorporated by reference herein.

BACKGROUND OF THE INVENTION

The present invention relates to software auditing systems and, more particularly, the invention concerns a method and system for monitoring the use and non-use of software programs.

Licensed software products, such as those from IBM, Computer Associates or Microsoft, are typically composed of a number of discrete executable components: exe-files, batch files, JCL, etc., herein collectively referred to as modules. A typical mainframe computer might have 500 products, composed of 500,000 modules on 3,000 libraries, often with many of the products duplicated on a number of libraries. While many software products are installed in default libraries specified by the vendor, some installations choose to link the more commonly used products into the system libraries.

Prior Isogon patents have described techniques for performing software auditing, including the steps of Surveying (scanning all hard-drives or disk storage for modules), Identification (deciding, for each module on each library, what software product it belongs to) and Monitoring (intercepting and recording all module executions). As described in those patents, and as practiced by Isogon's software auditing product, SoftAudit, the steps of Surveying, Identification, and Monitoring are both interrelated and separate processes.

The SoftAudit Monitor is also described in the present Assignee's issued U.S. Pat. No. 5,590,056, the contents of which are incorporated by reference herein. The SoftAudit Monitor collects usage data for (virtually) every load module executed within the system (image, LPAR). This usage data is correlated to survey and identification data to ultimately determine and report which software products, and the libraries in which they are installed, have and have not been used.

For the MVS and OS/390 operating systems, it does this by intercepting the LOAD, LINK, ATTACH, and XCTL system functions. Whenever such a function is invoked, the Monitor creates an entry in a memory table which relates the module usage to the job/job step/started task/TSO session (hereinafter, process) for which the module was loaded. Eventually, the usage data is written to external media (either when the memory buffer needs to be reclaimed, or on an hourly basis) and subsequently correlated with other data as previously described.

Due to the high number of executing modules, both the volume of data recorded and the processing time used can become excessive. In other situations, such as with different operating systems, intercepting system calls may not be practical or would greatly impact system response times.

SUMMARY OF THE INVENTION

The term module is meant to include executable software programs, executable script files such as Unix shell scripts, and interpreted programming languages such as Java and Basic.

It is an object of the present invention to provide an improved method of software auditing whereby the execution of software modules can be determined in a manner that does not overly burden system resources, and that this execution information can be correlated with other information to determine which products have been executed.

It is another object of the present invention to provide a method whereby the execution of software products can be determined according to their usage of the file system.

It is a further object of the present invention to provide a method whereby the non-use of software products can be detected.

It is yet another object of the present invention to provide a method whereby the load library from which a module was loaded can be determined.

The foregoing and other objects of the invention are essentially realized by a method and system in which the approach to auditing is designed to obtain data for fewer than all of the load modules that execute on the system. Preferably, the system employs intelligence to monitor activities and/or select information which best approximates the total number of software products that are executed in the system over selected time periods.

Other features and advantages of the present invention will become apparent from the following description of the invention which refers to the accompanying drawings.

BRIEF DESCRIPTION OF THE DRAWINGS

FIG. 2 is a sample output of the invention.
FIG. 2A is another sample output of the invention.
FIG. 3 is a sample output of the invention.
FIG. 6 displays an output of the invention.

DETAILED DESCRIPTION OF THE INVENTION

Reduced Overhead Determination of Software Product Usage

In one embodiment, the Monitor is implemented as a background process that periodically samples system data to determine which processes are active. As is well known in the computer art, operating systems control and define segments of program executions into "processes," job steps, etc. For some operating systems such as Unix, a background process can execute as a free running program (called a daemon) or be scheduled on a time basis using the "crontab" facility. In either case, the Monitor (described below) is able to sample the processing state of the system.

Figure 1:
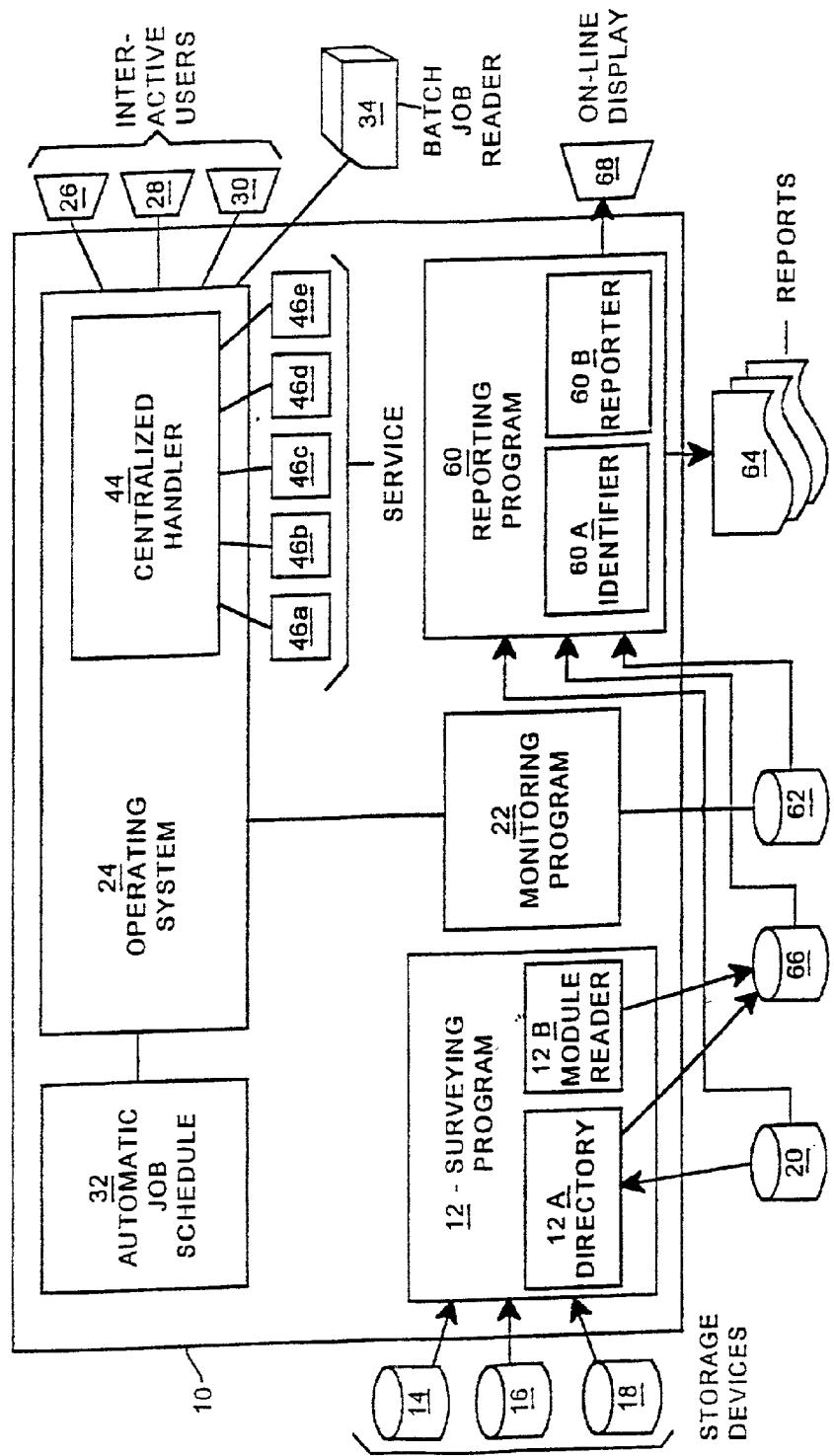
FIG. 1 shows a prior art software monitoring and surveying system.

With reference to prior art FIG. 1, a conventional computer system 10 is shown in block form. As is conventional, the computer system 10 includes an operating system 24 and may include an automatic job scheduler 32. As is also conventional, the computer system 10 connects the peripheral devices, examples of which are shown in FIG. 1 and may include one or more storage devices, for example, 14, 16 and 18, interactive user terminals 26, 28 and 30, and a batch job reader 34. Not all of these peripheral devices are required to be present, and varying computer systems will have differing peripherals. The operating system 24 may contain a centralized handler 44 for the processing of service requests. Where this is the case, services 46a–46e are usually also provided.

Generally, the present invention provides a system for monitoring, tracking and controlling the use of software products and the modules that comprise them. Instrumental to the operation of the invention are a monitor 22 shown in the form of a monitoring program, a surveyor 12 in the form of a surveying program, having an associate directory 12a and a module reader 12b which are operable in conjunction with a system configuration log 66 and a knowledge base 20. A further information log 62 communicates with the monitor 22 as well as with a reporting program 60 which uses an identifier component 60A and a reporter component 60B to generate reports 64. Conventionally, the computer system 10 also has an on-line display 68.

Thus, for example, when the Monitor 22 receives control under Unix, it can use system commands such as "ps" or the "kvm$_{13}$ getprocs" system call to take a snapshot of the current state of all active processes including the user name, the time they were started, how much CPU time has been used, and the directory (pathname) from which it is installed. FIG. 2 presents a sample of how the process state might appear in a snapshot 36 taken at 3:00 PM by the Monitor process (/etc/monitor), as indicated at 38.

In processing this data, the Monitor produces a table of executing modules and their pathnames. In the example of FIG. 2, the modules emacs, grep, less, man, monitor, netscape, ps, sh, telnet, tsch and vkbd are identified. If, for example, the Monitor takes a snapshot at 5 minute intervals, then the only new modules to be executed since 2:55 PM are the grep and ps system programs, and the Monitoring program—monitor. As the system command ps is used by monitor, the Monitor typically ignores itself and any modules it might use.

System programs, such as those that comprise the operating system itself, are typically not of interest. Thus, if filtering of known system programs is employed by the Monitor, it is likely that since 10:00 AM only programs such as netscape would be identified.

In this example, the method of extracting module information from each line of the process state encompasses the following steps:

1. Extract the time at which the process started.
2. Did the process start after the last snapshot was taken? If not, ignore this process and proceed to the next line.
3. Extract the pathname of the process and the module name, in particular. For example, the process "/usr/local/netscape" is located in the directory "/usr/local" and has a module name of "netscape."
4. Add the module name and, optionally other process related information to the module usage table such as the directory, start time, process ID, etc.
5. Optionally, adapt the scheduling of snapshots by detecting periods of high and low activity.

This module usage data is equivalent to that produced by software asset management products (such as SoftAudit, which gathers usage data by intercepting system functions) and can instead be used by such products to provide usage statistics and identify the software products they belong to.

Optionally, the Monitor adapts the frequency with which it takes a snapshot of the system processing state. It is important that the Monitor detect as many executing modules as possible. However, during periods of high processing activity a large number of processes may begin and end between snapshots. While the Monitor cannot go back in time to capture what has already been lost, it may adapt its schedule in accordance to process activity.

In comparing process ID (pid) data in a snapshot from one taken immediately prior, the Monitor determines how many processes have begun and ended in the intervening period, in other words, have been missed. Process IDs under Unix, and many other operating systems, are incremented for each new process that is executed. Thus if the Monitor subtracts the highest pid found in a prior snapshot (H) from the current pid of the Monitor itself (M), the result is an indicator of how many processes have been executed in the intervening time period. The Monitor then proceeds to take a count of all processes that have begun since the prior snapshot and are still executing (E). Subtracting this number from the number of processes that have been executed is an indicator of how many have been missed. In other words:

$$\text{Number of Missed Modules} = M - H - E$$

If this number is high, the Monitor can increase the frequency of its snapshots and, if the number is low, decrease the frequency to an acceptable level. Furthermore, the Monitor may examine a history of system activity, either from system logs or data maintained by the Monitor itself, to ascertain if these levels are normal or otherwise prior to adjusting its sampling rate.

For example, referring to the snapshot at 3:00 PM (FIG. 2) and a second snapshot 40 taken 5 minutes later (FIG. 2A), one will note that the highest pid, H, was 3692 in the earlier snapshot 36 and that M=3713 at 42 is the pid of the Monitor in the current snapshot. This means that 21 processes have run in the intervening 5 minutes. Comparing the two snapshots, only E=2 new processes (3586 and 3709) are detected, thus, 19 have been missed. Considering that nearly 90% of the intervening processes have been missed, the Monitor may adjust its sampling rate, or, after examining the system activity history determine that 21 processes in 5 minutes is considered low at this time of day and that no change in sampling rate is deemed necessary.

In another embodiment, the present invention deduces which software modules are used in a process by extracting load module information produced directly by the operating system while processing access requests such as LOAD, LINK, etc. for the process.

As a process executes, it makes access requests for modules. The operating system, in processing those requests, may create a table (or catalog) and/or library of these load modules. For each required module, the operating system makes an entry in the load module table (LMT) that may contain among other things, the name of the module, other process specific information such as process ID, etc., and perhaps, some attributes of the module such as its size, date of creation, and so on.

In this embodiment, the Monitor function is implemented to execute every time the end of a process is reached. This does not have to be the same time as when the process completes execution but rather at some time after which the operating system updates the LMT. MVS and OS/390 provide such facilities to initiate the Monitor in the form of an exit routine, hereinafter, a Monitor Exit. Alternatively, the Monitor Exit may be established to receive control when a function (such as FILE CLOSE), is invariably executed at or near the end of a process.

When the Monitor Exit is reached, the Monitor is activated and proceeds to read the LMT from which it determines the names of modules that have been cataloged and loaded for that process. For each module found in the LMT, the Monitor creates a record in a module usage table that contains the module name. Optionally, the Monitor also stores in the module usage table any other characteristics that the operating system might provide such as the module size, date of last change, other process information such as process ID, current time and date, etc.

Optionally, usage data is accumulated across processes. For example, when the next job step (or the job) completes, the Monitor Exit routine is once again activated. The LMT is again read and any new module entries are added to the module usage table. Names of modules already found in the table for the current job are ignored as they have already been identified as having been used for the current process. When the job is completed, the Monitor stores (appends) the module usage data in a file for further processing to identify the software products used, by such products as SoftAudit, in order to provide usage statistics, etc.

An additional facility of the present invention uses the module usage data to identify the software products used.

The method of determining product usage according to module usage data is performed in one of the following two ways:

1. Identify the names of all software products used by correlating module usage data using the Knowledge Base (KB) 20 that associates the names of modules to the software products they comprise.

2. Correlate the module usage data with an inventory of software products that itself has been correlated to the Knowledge Base 20.

Identification of Product Usage According to File Name

Generally speaking, virtually every software product performs some type of input/output and, in most cases, to specific files or datasets. For example, every time a software product is executed, i.e., one or more of the component modules is executed, it will read from and/or write to files such as a configuration files, temporary data files, output data files, etc. having specific names.

In some circumstances, different software products from the same vendor will share certain files which, in turn, are still unique to that vendor.

For example, some of the files "required" by products A and B on MVS might include:
PRODUCTA.PRODDATA—product A database
PRODUCTA.PREFS—product A preference file
PRODUCTB.USERDATA—product B user data file
PRODUCTB.INIT—product B initialization file For operating systems such as Unix, these files might appear as:
/usr/local/productA/proddata—product A database
/usr/local/productA/prefs—product A preference file
/usr/local/productB/userdata—product B user data file
/usr/local/productB/init—product B initialization file The first two files are unique to the family of software for product A, hence, the detection of any one of these files by a monitoring program is sufficient to identify the A product irrespective of the individual program in the product A module suite that actually performed the I/O. Similarly for product B.

The method of determining product usage according to file usage data is performed in the following steps:

1. Monitoring—determine the names of all files used by a process;

2. Identify the names of all software products used by correlating file name usage data using a Knowledge Base that associates file names to software products;

3. Optionally, determine the modules comprising each software product used.

1. Monitoring File Usage

In one embodiment, the Monitor is implemented as a background process that periodically takes a snapshot of system data to determine which files are currently in use, optionally filtering out those known to be temporary files. For Unix, the monitoring process can execute as a daemon process or be scheduled on a time basis using the "crontab" facility. In either case, the Monitor is able to take a snapshot of the current state of the files in use, optionally adapting its schedule according to system activity.

For example, when the Monitor receives control under Unix, it can use commands such as "fstat" or the "kvm_files" system call to sample the state and certain characteristics of all active files. Such information includes the user name, name of the process and its process ID, and the pathname (name and directory) of the file. FIG. 3 is a sample 48 of how the file state might appear in one snapshot.

In processing and filtering this data, the Monitor produces a table of open files for the processes emacs, man, netscape, and telnet. The filter has removed temporary files such as those having pathnames beginning with "/usr/tmp/tempfile" and other "known" system parameter files such as /usr/local/info.

Note that the command name (e.g., emacs) of the process using that file can also be used by the Monitor to filter out file usage by system programs. For example, if a required configuration file for software product A is being edited by the user, one might conclude that simply on the basis of file usage that product A was executing when in fact it had not. Filtering out this occurrence eliminates this false conclusion.

An entry is created in a file usage table for each new file name found for the same process ID. Other process information such as process ID, and optionally, command name, the current time and date, etc. are also saved in the file usage data record.

Optionally, the Monitor adjusts its sampling rate in a manner similar to that described in an earlier embodiment.

In another embodiment, the Monitor function is implemented as an intercept placed in either or both of the file OPEN and CLOSE system functions.

Whenever activated, the Monitor determines the name of file that is being used by the current process. An entry is created in a file usage table for each new file name found for the current process. Other process information such as process ID, and optionally, the current time and date, etc. are also saved in the file usage data record.

If, in one instance, the Monitor determines that the name of a file is already in the table and has the same process ID, the instance is ignored and no entries are made in the file usage table.

Alternatively, the Monitor function, operating in a manner such as a Monitor Exit, reads the JCL data structures of the current job or the in-storage data created therefrom by the operating system, such as the Task Input Output Table (TIOT), to obtain the dataset names specified by various DD (Data Definition) statements in the job and stores those results in the file usage table.

In yet another alternative, the Monitor, perhaps operating as a batch process, reads the Unix system accounting logs or MVS and OS/390 System Management Facility (SMF) data file at some point in time, after the completion of the process itself, to determine the file names and load libraries used on a job-by-job and process-by-process basis and stores these results in the file usage table.

2. Identifying Software Product Usage

The File Knowledge Base (FKB) is a database of records which associates file names to the software products which use them. In addition to the files name, the FKB might contain other attributes such as:

- Flags indicating if the file is used uniquely or shared among vendor products;
- Number of file matches ("hits") required for correlation with a product;
- File type such as text, binary, database, etc.;
- Always used or used sporadically;
- File size, creation date, etc.;
- Embedded strings of text or data;
- Etc.

Using various heuristics and perhaps some of these attributes, an Identifier facility 60A takes the file names determined by the Monitor and correlates these against those in the FKB to deduce a list of software products which have been executed and stores that information in a product usage table. For example, if the Identifier determines that a process uses 10 files of which 9 hits are found for product A and only 1 hit for product B, then product A is the most probable choice.

3. Determine the Modules Comprising Each Software Product Used

As another feature of the current embodiment, the Identifier determines the modules which comprise each software product that has executed and stores that information in a module usage table.

For each software product identified in the previous step as having been used, the present invention retrieves the list of modules that comprise the product from a knowledge base (KB) that correlates module names to software products and vice versa. This information is stored in a separate table, file or as part of the module usage table.

Such information may be used by another embodiment of the present invention to determine the load library from which each software product executes from.

Determination of Unused Software Products

In another embodiment, the present invention determines which software products have not been used on a computer system.

The general procedure is as follows:
1. Determine the software products used;
2. Determine the inventory of software products on the computer system;
3. Compare the list of products used to the inventory of such products to produce a list of unused products.

Typically, the method for determining software products that are used involves the steps of determining the modules that are used (as described above, or in Isogon's earlier patents) and correlating those modules against a module-to-product knowledge base (KB). Optionally, the library on which the product resided is also determined.

An inventory of software products is performed similarly, however, the module and library data is obtained by performing a survey of all storage devices. The modules found are correlated against the module KB to identify the software product name. The same product may be found to reside on multiple libraries for reasons such as keeping backup copies. Such techniques are used by software asset management products such as SoftAudit.

Figure 4:
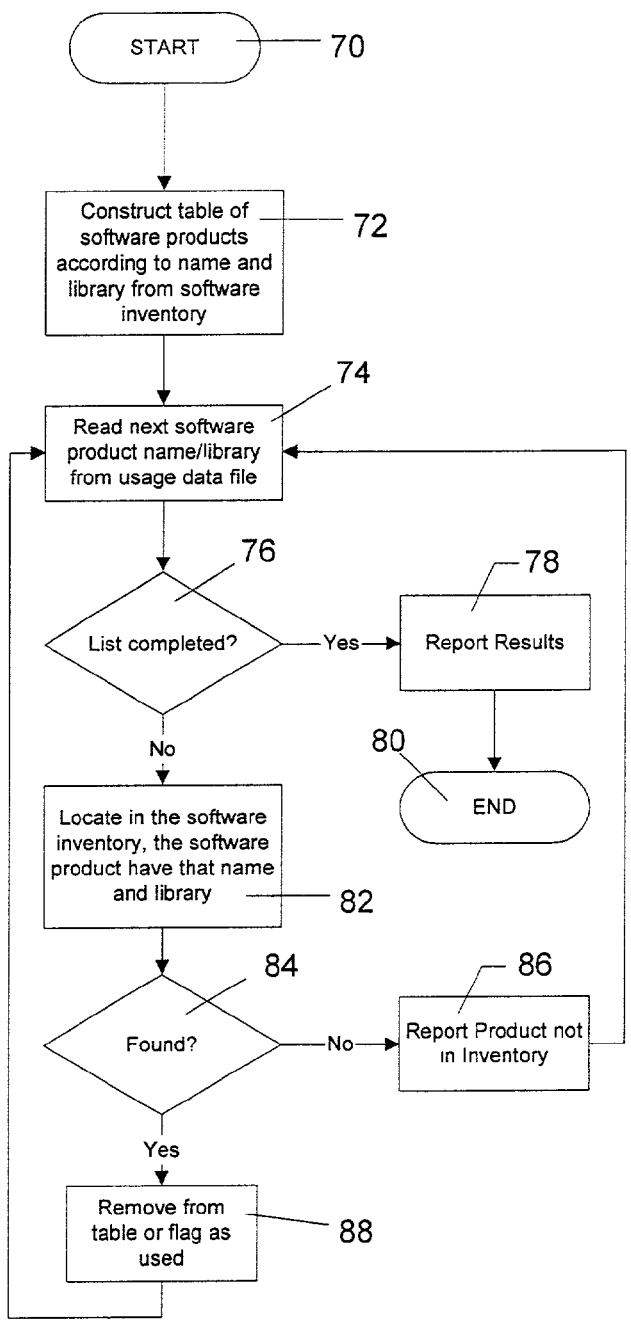
FIG. 4 is a first flow chart of the invention.

At some point in time, after sufficient product usage data has been accumulated or obtained from other sources, the present invention determines which software products have not been used (FIG. 4).

The self-explanatory process steps shown in FIG. 4 listed below are as follows:
1. Start of process—step 70;
2. Construct table of software products according to name and library from software inventory;—step 72;
3. Read next software product name/library from usage data file—step 74;
4. Determine whether the list has been completed—step 76;
5. If list has been completed, report results—step 78;
6. Report results and end—steps 78, 80;
7. If a list has not been completed, locate in the software inventory, the software products that have that name and library—step 82;
8. Determine whether any software products were found—step 84;
9. If none found, report products not in inventory (step 86) and return to step 74;
10. If yes, remove from table or flag as used—step 88—and return to step 74.

In one embodiment, a table (list) of all software products and the libraries they are installed on is made using inventory data. For each software product/library entry found in the usage file, the corresponding entry in the inventory list is either removed or flagged as having been used. (If a corresponding entry is not found in the inventory list for an entry in the usage table, it is probably due to survey data that is out of date and is optionally reported to the user.) After all usage data entries have been processed, the resulting table reflects all software product/library combinations which have not been used.

Optionally, the present invention flags or removes all entries in the inventory list that correspond to a used software product. The resulting table reflects all software products that have not been used irrespective of the library or libraries they reside upon.

Determination of the Library a Module was Loaded From

In another embodiment, the present invention determines the load library from which each module executed has been loaded and stores that information in a module usage table.

The general procedure involves the following steps:
1. Obtain a list of the modules that have been used by a particular process.
2. Determine the load libraries and their search order used by the process.
3. Using the search order determined in the previous step, search the load libraries for the first library containing the same modules that best matches the list of modules used.

Other embodiments of the present invention provide a Monitor function that determines a list of modules used. This list is kept in a module usage table that optionally contains additional process information. Alternatively, module usage data from other usage monitoring products such as SoftAudit can be imported into the present invention and incorporated into the module usage table in place of or in addition to any other usage data.

The next steps of determining the correct load libraries in their appropriate search order and further determining which libraries the modules executed from can be embodied in any or all of the following ways:

As a concurrent process wherein module usage data and load libraries selection data are both obtained by the Monitor and library usage is determined at the same time.

As separate processes wherein module usage data, on the one hand, and load library data, on the other, are obtained from separate sources and processed to determine load library usage. For example, module usage data is obtained using the previously described method of determining software product usage according to file usage and library selection data is determined from the SMF data file.

As separate processes wherein one of the module usage data or library selection data is obtained by the Monitor and the other obtained from a separate source and processed to determine load library usage. For example, module usage data is obtained from a monitoring product such as SoftAudit and library usage is determined from the Monitor function described below.

The following description of the present invention is specific to a concurrent process on a mainframe operating system such as MVS, however, the method is equally applicable to other operating systems and other embodiments previously described.

For mainframe operating systems such as MVS, as the JCL for the job is interpreted and subsequently executed (i.e., the job and its individual job steps are processed), the operating system, following a prescribed search order, determines which load libraries are to be searched for the modules subsequently accessed via system calls such as LOAD, LINK, etc.

The JCL interpreter is capable of defining "generic" load libraries to be used within a specific scope and searched in a specific order. If the user so desires, he can define a library of modules to be known generically throughout his entire job as JOBLIB. Similarly, the user has the option to define a library of modules that changes with each step in the job. This is known as STEPLIB. The operating system saves each of these JOBLIB and STEPLIB definitions in a list (load library list). Lastly, system libraries, such as SYS1.LINKLIB or SYS1.USERLIB, and the modules they contain are readily available to all job processes. For this reason, some computer installations choose to install commonly used software products in these libraries.

Figure 5:
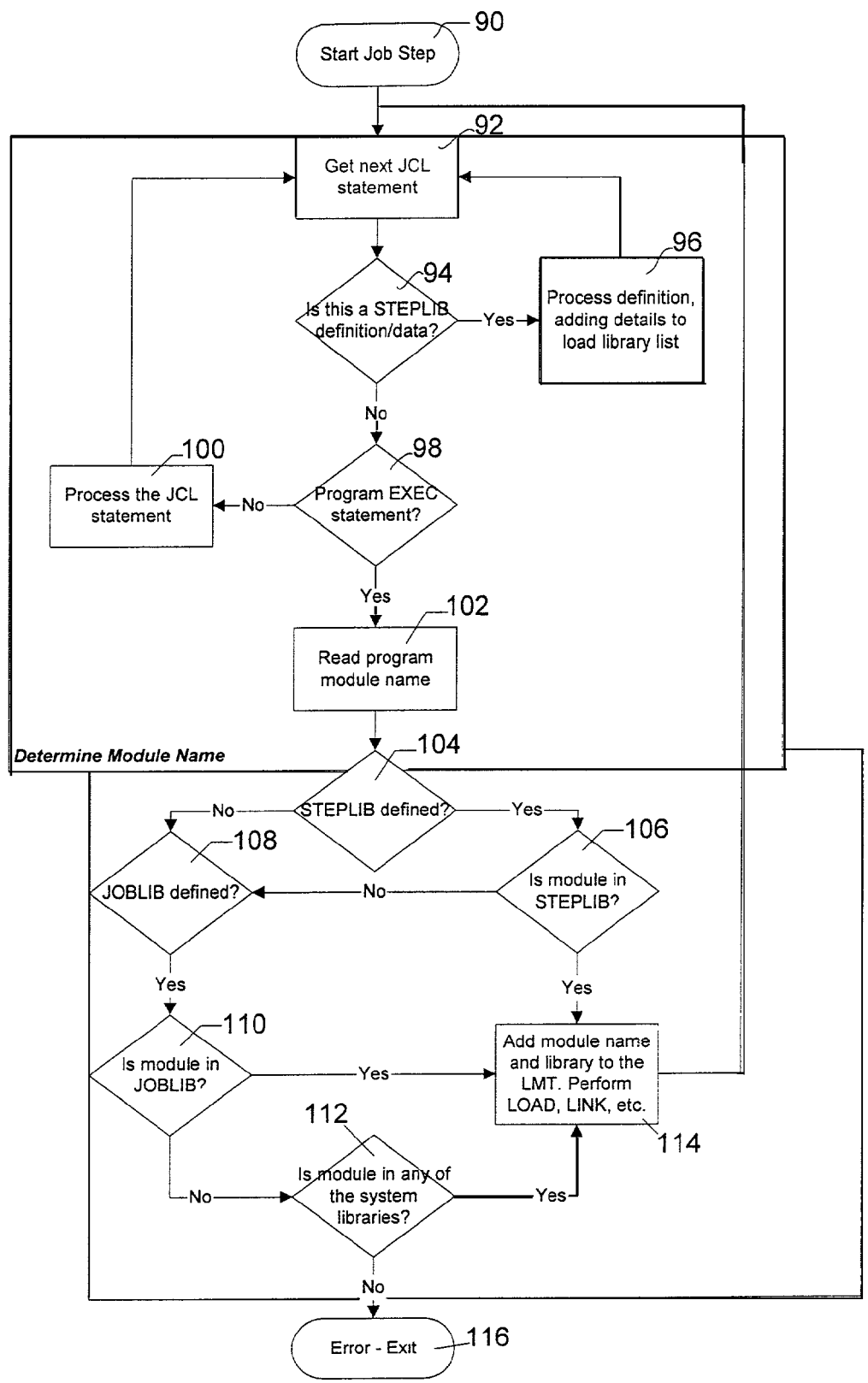
FIG. 5 is a second flow chart of the invention.

Referring to FIG. 5, when a module is accessed via LOAD, etc., the operating system searches the load libraries for that module in a specific order of precedence—the current STEPLIB first, then JOBLIB, followed by the system libraries SYS1.LINKLIB, etc. If the module is not found in STEPLIB or it is not defined, JOBLIB is searched. If not found in JOBLIB, or a JOBLIB is not defined, the operating system proceeds to search in turn each of the system libraries.

For example, the fragment 150 of JCL in FIG. 6 demonstrates the use of software product libraries in JOBLIB and STEPLIB statements, as well as the search procedure for some product specific programs (RPORTA for product A and SORTB for product B) and a system program (FIND).

In this example, the JOBLIB DD statement specifies that the programs for software product A in library PRODUCTA.LOADLIB be known and available throughout the job. In STEP1, the system is directed to use the program "FIND", which in this example is located in one of the system libraries. As there is no STEPLIB for this job step, the system searches the designated JOBLIB, PRODUCTA.LOADLIB, for a module with that name. Having not found it there, the system then searches the system libraries where it is finally found and loaded into the computer's memory for execution.

In STEP2, the user has designated that the programs for software product B located in the library PRODUCTB.LOADLIB be available for the current job step (i.e., STEPLIB). The system is instructed in the STEP2 EXEC statement to use the program "SORTB". It begins by searching PRODUCTB.LOADLIB where it finds the module SORTB and loads it into the computer's memory for execution.

Lastly, in STEP3, the user has not designated a STEPLIB and the definition from STEP2 has, so to speak, expired. The system is instructed in the current EXEC statement to use the program "RPORTA". The JOBLIB definition is still in effect, hence, it begins by searching PRODUCTA.LOADLIB where it finds that module and loaded into the computer's memory for execution.

Upon execution, should a program, such as SORTB, request that other modules be loaded and subsequently executed, the operating system conducts a search using the very same search order as that used to load SORTB (i.e., in STEP2) to load the desired modules into the computer's memory for execution.

The present invention determines the identity and order of the load libraries used by a particular process by reading the JCL data structures of the current job to obtain the load library list for the process, or by referring to equivalent in-storage data created from the JCL by the operating system, such as in OS/390, the Task Input Output Table (TIOT). Optionally, the Monitor stores this data in a library selection table for processing by other programs.

FIG. 5 shows the foregoing and additional detail steps associated with determining module names, steps (90–102) and locating a module for a load link (steps 104–116).

Figure 7:
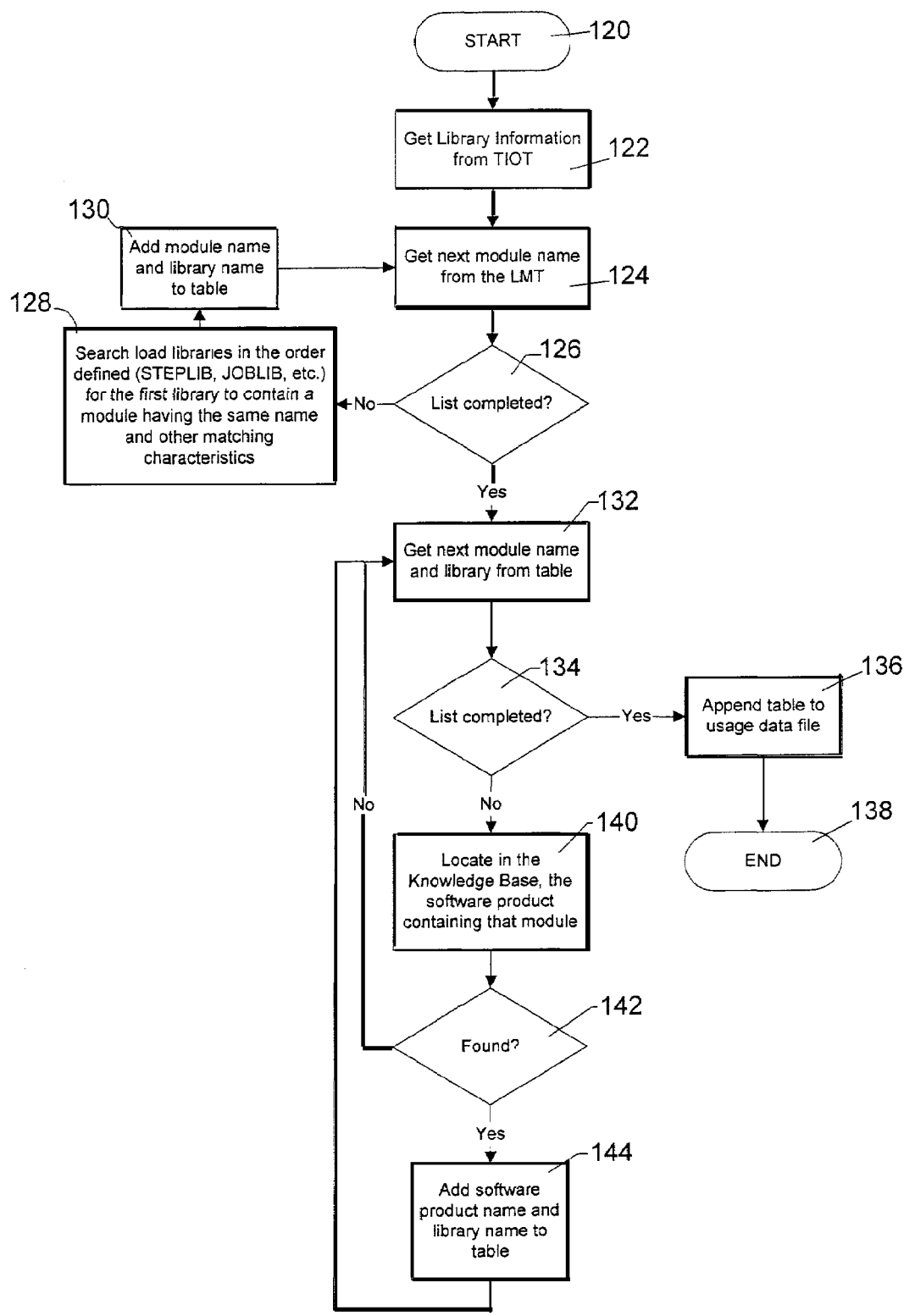
FIG. 7 is a third flow chart of the invention.

Referring to FIG. 7, the Monitor proceeds to locate the load library from which the module was accessed using the same search order of precedence as used by the operating system. Reading the appropriate list of selected load libraries, such as contained in the TIOT, the Monitor determines which physical load libraries have been associated with the current STEPLIB and JOBLIB, if any. For each module located in the LMT, the Monitor searches for a module with that name in the physical library defined as the STEPLIB. If that module has not been found or a STEPLIB is not defined, the Monitor performs the same process for the physical library named as the JOBLIB. Similarly, if the module is not in JOBLIB or a JOBLIB is not defined, the Monitor performs the repeats the process in turn, and in the same order as the operating system, for each of the system libraries until found.

The search ends with the first physical library found to contain that module. If the results are inconclusive, or as an added measure of confidence, the module characteristics, such as size and date, can also be matched against those of the module found in the physical library.

The entry in the module usage table is augmented to include the physical name of the library in which the module was found and those results are stored for processing and interpretation by another program.

The process is repeated until all modules have been processed, as shown in the detailed steps 120–144 in FIG. 7.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for determining program usage on a computer, the system comprising:
   a plurality of executable software programs constituting software products, each of the software products being constituted of one or more load modules, the load modules being stored in at least one memory of the computer;
   an operating system of the computer that controls execution in the computer of the software products through the invocation of respective load modules thereof;
   a monitor that is periodically triggered to collect load module execution information;
   a filtering facility that is effective to filter at least one previously identified program from the load module execution information;
   a correlator that correlates the filtered load module execution information with data that associates load module names with corresponding software products and develops a list of software products executed in the computer over the course of a given time period; and
   a reporter that outputs data reflecting the use of the software products in the computer in terms of software product names thereof.

2. The system of claim 1, in which the monitor operates by taking periodic snapshots of the then current state of active processes in the computer.

3. The system of claim 2, in which the load module execution information includes one or more of the following data items: module names, user names, the time when processes were started, how much CPU time has been used, and a directory path name from which processes were installed.

4. The system of claim 2, including a facility that allows adjusting the period between snapshots in response to program usage activity levels.

5. The system of claim 2, in which the monitor produces a list of executing load modules and their respective directory path names.

6. The system of claim 2, including a facility that determines how many processes have begun and ended between snapshots.

7. The system of claim 2, including a facility that compares successive snapshots to determine which modules have executed and how many were missed.

8. The system of claim 2, in which processes are identified by PID (Process IDs) numbers and the monitor includes a facility that obtains a measure of missed processes by calculating M minus H minus E, where M represents a current PID, H represents the highest PID found in a prior snapshot and E represents a count of all processes that have begun since the prior snapshot and are still executing.

9. The system of claim 1, including in the load module execution information module names and other process related information including directory, start time, and process ID.

10. The system of claim 1, in which the correlator operates in conjunction with a knowledge base that associates load module names with software product names.

11. The system of claim 10, in which the knowledge base is a database of records which also associates file names to software products that use them and additionally includes at least one of the following: flags indicating if a module is used uniquely or shared among vendor products; a number indicating file matches required for correlation with the product; file type; file size; file creation date; and embedded strings of text.

12. The system of claim 1, further including a surveying program that develops an inventory of substantially all software products on the computer and a facility which produces a list of non-used software products based on comparing the inventory of software products against the data outputted by the reporter which reflects the use of the software products in the computer.

13. The system of claim 1, in which the correlator operates by correlating module usage data with an inventory of software products that itself has been obtained by correlating in a knowledge base load module names with software product names.

14. A system for determining program usage on a computer, the system comprising;
   a plurality of executable software programs constituting software products, each software product being constituted in turn of one or more load modules, the load modules being stored in at least one memory of the computer;
   an operating system of the computer that controls execution in the computer of the software products through the invocation of respective load modules thereof;
   a monitor that collects load module execution information by deducing which load modules are being used in given processes of the computer, without directly monitoring the actual invocation by the operating system of the load modules;
   a filtering facility that is effective to filter at least one previously identified program from the load module execution information;
   a correlator that correlates the filtered load module execution information with data that associates load module names with corresponding software products and develops a list of products executed in the computer over the course of a given time period; and
   a reporter that outputs data reflecting the use of the software products in the computer in terms of software product names thereof.

15. The system of claim 14, in which the monitor obtains the load module execution information from a load module table created by the operating system which makes entries in the load module tables as processes are executed and access requests for load modules are made.

16. The system of claim 14, in which the monitor is implemented to execute every time the end of a process is reached.

17. The system of claim 14, in which the monitor executes as an exit routine near the end of a process.

18. The system of claim 14, in which the monitor gathers and accumulates usage data across sub processes of a higher level process so that when the load module table is successively read, only those module entries not previously encountered in a prior sub process of the current high level process are accumulated and names of load modules already found in the table for the current high level process are ignored.

19. The system of claim 14, in which the correlator operates by identifying the names of all software products used by correlating module usage data by using a knowledge base that associates the names of load modules with software products they comprise.

20. The system of claim 14, in which the correlator operates by correlating module usage data with an inventory of software products that itself has been obtained by correlating in a knowledge base load module names with software product names.

21. A system for determining non-usage of software products on a computer, the system comprising:
- a plurality of executable software programs constituting software products, each of the software products being constituted of one or more load modules, the load modules being stored in at least one memory of the computer;
- an operating system of the computer that controls execution in the computer of software products through the invocation of respective load modules thereof;
- a software product surveyor that surveys the at least one memory of the computer and produces an inventory of the names of the load modules, the surveyor being operable with an associator that identifies and associates and records associations between product names and the load module inventory names;
- a monitor that collects load module execution information over a given time period;
- a filtering facility that is effective to filter at least one previously identified program from the load module execution information;
- a correlator that correlates the filtered load module execution information with data that associates load module names with corresponding software products and develops a list of products executed in the computer over the course of a selected time period;
- a comparing facility that compares information provided by the correlator to information provided directly or indirectly by the surveyor and which produces a list of unused software products; and
- a reporter that outputs data reflecting the non-use of software products in the computer.

22. The system of claim 21, in which the comparator is constructed to delete from the inventory those software product names which have been detected by the monitor as having been executed in the computer at least once during the given time period, leaving a list of non-used software products.

23. A system for determining program usage on a computer, the system comprising:
- a plurality of executable software programs constituting software products, each of the software products being constituted of one or more load modules, the load modules being stored in at least one memory of the computer;
- an operating system of the computer that controls execution in the computer of software products through the invocation of respective load modules thereof;
- a monitor that collects load module execution information reflecting the usage of software products on the computer;
- a filtering facility that is effective to filter at least one previously identified program from the load module execution information;
- a correlator that correlates the load module execution information with data that associates load module names with corresponding software products and develops a list of software products executed in the computer over the course of a selected time period;
- a library source determination facility that determines the load library from which each executed load module has been loaded; and
- a reporter that outputs data showing the directory paths for load modules that have been executed.

24. The system of claim 23, in which the library source determination facility obtains a list of modules that have been used by a particular process, determines the load libraries and their search order used by the process, and using a search order determined in a prior step, searches the load libraries of the computer for a first library containing the same modules that best matches the list of modules used.

25. The system of claim 24, in which the task of determining the correct load libraries in their appropriate search order is carried out as a separate process, wherein one of the module usage data or library collection data is obtained by the monitor and the other is obtained from a separate source and processed to determine load library usage.

26. The system of claim 23, in which the monitor operates as a concurrent process and module usage data and load library collection data are both obtained by the monitor and library usage is concurrently determined.

27. The system of claim 23, in which the library source determination facility uses a JCL (Job Control Language) interpreter.

28. The system of claim 23, in which the load library determination facility determines both the identity and order of load libraries used by a particular process by reading job control language ("JCL") data structures of a current job to obtain a load library list for the process.

* * * * *